Jan. 19, 1960 R. F. PEDRICK 2,921,987

TWO-WAY TRUNK CIRCUIT

Filed Feb. 14, 1958 2 Sheets-Sheet 1

INVENTOR
ROBERT F. PEDRICK

ATTORNEY

Jan. 19, 1960 R. F. PEDRICK 2,921,987

TWO-WAY TRUNK CIRCUIT

Filed Feb. 14, 1958 2 Sheets-Sheet 2

INVENTOR
ROBERT F. PEDRICK
BY J. Warren Whitesel
ATTORNEY.

United States Patent Office 2,921,987

Patented Jan. 19, 1960

2,921,987

TWO-WAY TRUNK CIRCUIT

Robert F. Pedrick, Rochester, N.Y., assignor to General Dynamics Corporation, Rochester, N.Y., a corporation of Delaware

Application February 14, 1958, Serial No. 715,400

9 Claims. (Cl. 179—27)

This invention relates to communication systems and particularly to trunking arrangements between private automatic branch exchanges and dial operated central offices.

The present invention is embodied in a two-way trunk circuit over which incoming calls from a central office may be directed to an attendant's cabinet and over which calls to the central office may be extended either from a trunk appearance at said attendant's cabinet or from a switch train in the private automatic branch exchange.

An object of the invention is to provide toll restriction on outgoing calls attempted over the said switch train whereby such toll calls must needs be established through the said attendant's cabinet where proper supervision may be exercised.

Another object of the invention is to deny service to dialed calls from within a private automatic branch exchange wherein an area code (whose second digit is either 1 or 0) is transmitted.

In accordance with the present invention a two-way trunk line is provided over which outgoing calls to a dial operated central office may be extended either automatically by way of a switch train or manually by way of an attendant's cabinet. A minor switch is provided and is made responsive to dial pulses transmitted over the trunk from the said switch train but is unresponsive to like pulses transmitted from the attendant's cabinet. This minor switch will therefore set up a bar to a toll connection which is characterized by certain first digits so that a toll connection may be set up by dispensation only when routed under the supervision of the attendant. Thus when a subscriber attempts to set up an unauthorized call by way of a switch train the said minor switch will respond and cut off the connection of the trunk to the central office while connecting the subscriber to a source of tone such as a busy signal and this condition will be maintained until the subscriber releases the connection.

By the same token, long distance calls, characterized by the dialing of an area code are barred, where the first digit is used to reach the trunk of the present invention and the second digit is a 1 or a 0, characteristic of area codes in the national numbering plan.

A feature of the present invention is a multiple access trunk having ordinarily like operating response when seized over any access branch thereto but which will not respond to attempts to set up an unauthorized connection from a given one of said access branches.

Another feature of the invention is a means responsive to the attempt to set up an unauthorized call completely cutting off the branch over which the attempt was made whereby the trunk may be freed for other use over another access branch. Under such conditions the branch over which the unauthorized connection has been attempted will be held under control of the subscriber and will not be released until such call is abandoned whereby that branch may be reconnected to the trunk without disturbance to any other call which may have been established in the meantime.

Another feature of the invention is a means to isolate a subscriber who attempts to establish an unauthorized connection whereby he will be unable to hold the trunk out of commission beyond the time taken for the determination of the unauthorized character of the call.

Another feature of the invention is the use of a busy signal at the attendant's cabinet to indicate the busy condition of the trunk when it is engaged in a connection set up over a switch train. When, however, such a connection is one in which the subscriber has attempted to set up an unauthorized connection and has been isolated, the said busy signal will return to normal thus indicating that the trunk is free for use.

Other features will appear hereinafter.

The drawings consist of two sheets having two figures, as follows;

Fig. 1 and Fig. 2 when placed with Fig. 2 to the right of Fig. 1 constitute a schematic circuit diagram of a two-way trunk circuit embodying the features of the present invention.

In general, such a trunk circuit terminates at one end in a private automatic branch exchange where it has an appearance consisting of a jack 1 and its accompanying line lamp 2 and busy lamp 3 in an attendant's cabinet where incoming calls may be answered and from which outgoing calls may be established manually. The trunk also has an appearance 4 in the bank terminals of a selector or switch-through connector by which the trunk may be seized and used for central office connections. A night service jack 5 is provided by which conventional connections for providing service in the absence of the attendant, may be established. When such night service connection is established the sleeve of the trunk branch 4 is grounded so that this branch cannot be used at night. A conventional arrangement is a switch 6 by which the battery supply may be cut off of certain parts of the circuit represented by the day battery symbol consisting of a minus sign enclosed within a square.

The trunk, at the central office end reached over a two conductor line consists of conventional line circuit, finder selector and connector means.

The outstanding feature of this trunk is the provision of a minor switch having the wiper 7 which may be stepped forwardly by the MX magnet 8 and later released by its MZ release magnet 9. This minor switch is responsive to dial pulses transmitted over the branch 4 and the night service jack 5. If it is driven to its terminal 1 or 0 it will cause the operation of the unauthorized call relay 10 whereupon the branch 4 will be isolated and the remainder of the trunk returned to normal service. If it is driven to any one of the terminals 2 to 9 inclusive, it will cause the operation of the authorized call relay 11, whereupon a normal connection may be established.

DETAILED DESCRIPTION

*Outgoing call from selector bank*

Figure 1:
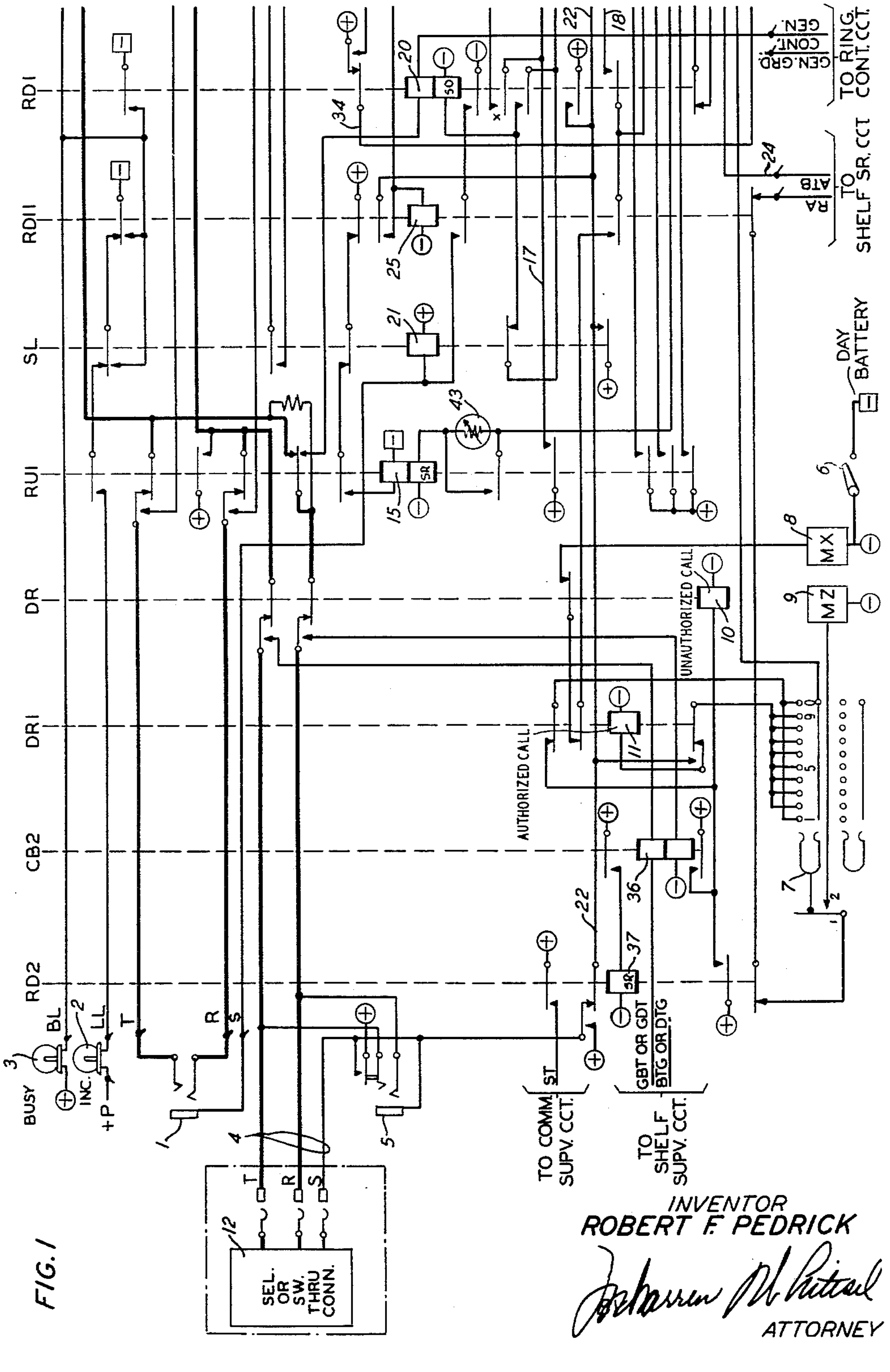
Figure 2:
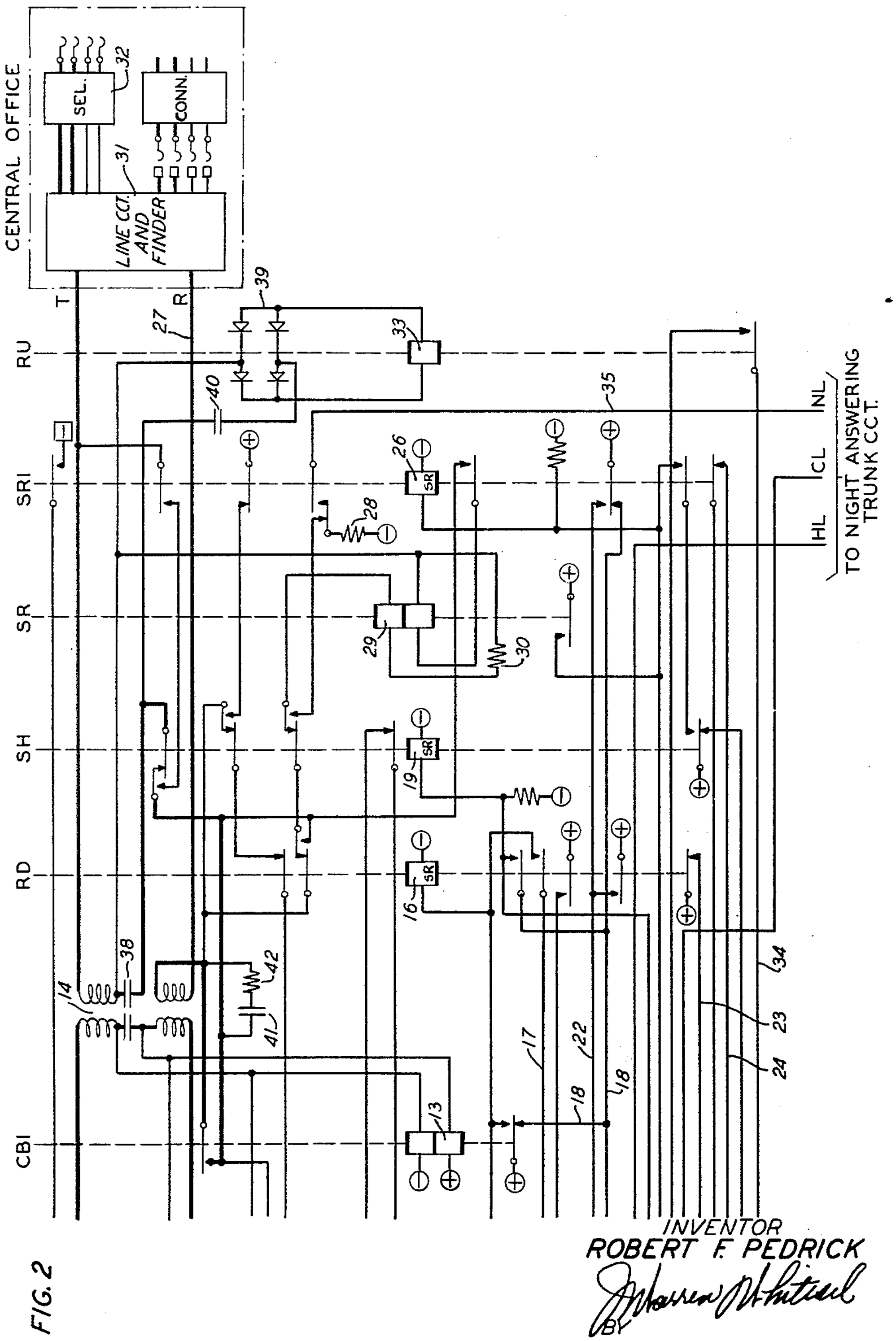

When this circuit is seized by a selector or switch through connector 12, the preceding switch bank T & R loop is closed to cause the operation of the calling bridge CB–1 relay 13. The circuit for this may be traced from ground, the lower winding of CB–1 relay 13, the lower left coil of the repeating coil 14, an armature and back contact of the DR relay 10 to the tip T of the line and from battery the upper winding of the CB–1 relay 13, the upper left coil of the repeating coil 14, a back contact and armature of the slow releasing RU–1 relay 15, an armature and back contact of the DR relay 10 to the ring R of the branch 4.

The CB–1 relay 13 operates and causes the operation of the slow release RD relay 16. The RD relay operates, prepares a holding circuit to itself from the wire 17, closes a circuit from the normally grounded wire 18 to the winding of the slow releasing SH relay 19, closes a circuit from battery, lower winding of the RD–1 slow operating relay 20, through a back contact and armature of the SL relay 21 and a front contact and armature thereof to ground, prepares a holding circuit for the RD–1 relay 20, applies ground to the sleeve lead 22 connected to the preceding switch bank to hold the preceding equipment and mark the circuit busy to other calls and removes ground from the wire 23 leading to the all trunks busy ATB lead 24.

The SH relay 19 operates and opens the operating path to the RD–11 relay 25 and transfers the central office line to ground on an armature and back contact of the slow releasing SR–1 relay 26, the lower right coil of the repeating coil 14 to the ring wire 27, and resistance battery through resistance 28, the upper winding of the SR relay 29, resistance 30, the upper right coil of repeating coil 14 to the tip T of the central office line, thus seizing the central office line circuit 31 and a selector 32. The SH relay also disconnects the ring up RU relay 33 from the central office line and prepares a holding circuit for the SR–1 relay 26.

The RD–1 relay 20 responds by its lower winding to the RD relay 16, prepares a circuit through a back contact and armature of the SH relay 19 to the winding of the RD–11 relay 25 and applies day battery to the busy lamp 3 on the attendant's switchboard. Relay 20 also prepares a circuit for the sleeve SL relay 21 and closes a holding circuit for itself directly to the front contact of the RD relay 16. The RD–1 relay connects an alternate ground to the sleeve lead 22 to the preceding equipment, further opens the ATB lead, prepares part of the impulsing path to the MX magnet 8 and opens a ground connection to conductor 34 constituting part of an operating path of the RU–1 relay 15.

When the line finder in the central office has found the calling line, resistance ground is conventionally applied to the T lead thus closing a circuit for the upper winding of the SR relay 29 and resulting in the temporary operation of this relay. The operation of the SR relay 29, momentarily grounds the winding of the SR–1 relay 26 which operates, locks to the SH relay 19 and opens the upper winding of the SR relay 29. The operation of the SR–1 relay places a shunt on the lower winding of the SR relay 29 until the SH relay 19 releases, removes ground from the R lead 27 and the resistance battery from the T lead, thus releasing the SR relay 29. The SR–1 relay 26 locks to the ground at the front contact of the SH relay 19, and applies resistance battery to the NL lead 35 of the night answering trunk circuit and connects an alternate battery to the BL lead. The SR–1 relay opens a circuit to the SH relay 19 by removing ground from the conductor 18 and applies this as an alternate ground to the sleeve wire 22.

The SR relay 29 restores and opens the original operating circuit of the SR–1 relay 26, leaving this relay operated through the armature and front contact of the SH relay 19.

The SH relay now restores, closes a circuit for the RD–11 relay 25, opens the holding circuit of SR–1 relay 26, removes the shunt of the upper right coil of the repeating coil 14 from about the lower winding of the SR relay 29 and reconnects the lower winding thereof across the T & R of the central office line to maintain a bridge thereon.

The RD–11 relay operates and applies an alternate battery to the BL lead, removes ground from the holding circuit of the RU–1 relay 15, closes a holding circuit for itself from the sleeve lead 22 and completes the impulsing path to the MX magnet 8.

The SR relay 29 reoperates from the central office battery, the SR–1 relay remaining operated during the transfer of the SH and SR relays due to its slow release characteristics.

The SL relay 21 operates through a front contact and armature of the RD–11 relay 25 and applies alternate ground to the sleeve lead 22 to the preceding equipment.

Dial tone, returned from the central office notifies the calling subscriber that the circuit is ready for dialing.

*Dialing*

Upon the first dial pulse, the tip and ring bridge causing the operation of the CB–1 relay 13 is opened and this relay releases. The circuit to the release delay RD relay 16 is opened but this relay due to its slow releasing characteristics will not release during such dial pulses. The SH relay now operates from the back contact of the CB–1 relay and this also completes the circuit for the MX magnet 8. The CB–1 relay opens the loop to the central office thus forwarding the dial pulse.

The SH relay 19 operates, closing a holding circuit for the SR–1 relay 26, shunts the lower winding of the SR relay 29 and the upper right coil of the repeating coil 14 for better pulse transmission, removes the upper winding of the SR relay 29 from the circuit, opens the original operating path to the RD–11 relay 25, leaving this relay locked under its own control and holds the ground off the wiper 7 of the minor switch.

The SR relay 29 restores, opens the original operating circuit to the SR–1 relay 26, transferring the latter to its holding circuit from ground on the operated contacts of the SH relay 19.

The MX minor switch magnet operates and steps the minor switch to the first terminal, thus moving the switch off normal and preparing a circuit for the MZ release magnet 9.

Upon completion of the first impulse the tip and ring bridge to the CB–1 relay 13 is reclosed and the CB–1 relay reoperates. The reoperation of this calling bridge relay recloses the bridge to the central office and opens the circuit to the SH relay 19 and the stepping magnet 8.

The CB–1 relay 13 follows the dial impulses, opening and closing the tip and ring loop to the central office thus forwarding the dial impulses to the central office equipment in accordance with the digit dialed and opens and closes a circuit to the MX magnet thus stepping the minor switch in like manner.

The SH relay remains operated during dialing from the back contact of the calling bridge relay and the RD relay likewise remains operated during dialing from the front contact of this calling bridge relay. The SH relay 19 restores after the first digit, reoperating the SR relay 29 which holds the SR–1 relay 26 operated and applies ground to the wiper 7 and thus to the bank contact to which this minor switch has been advanced.

*Unauthorized call*

If the digit "1" or "0" has been dialed, this will represent a toll call. It may also be noted that the digit 1 or 0 is the second digit in an area code, so that if the subscriber dials the first digit of an area code and reaches this trunk then the second digit will characterize the call as unauthorized. In any case, where the minor switch is driven to its 1 or its 0 terminal, a circuit will be established over a back contact of the authorized call relay 11 to the winding of the unauthorized call relay 10 resulting in the operation of this DR relay 10.

Upon the operation of relay 10, the circuit of the MX magnet 8 is opened, and the loop of the connection from the selector 12 is transferred from the CB–1 relay 13 to the windings of the CB–2 relay 36 through whose upper winding a tone such as ground busy tone or ground dial tone may be applied to the telephone from which this unauthorized call has been made thus notifying the subscriber that he cannot make such a call but must seek service by way of the attendant's position.

The CB–1 relay 13 restores and opens the loop to the central office, opens the circuit to the SR relay 29, closes a circuit to the SH relay 19 and opens the circuit to the RD relay 16.

The CB–2 relay 36 operates under control of the calling subscriber, whereupon the RD–2 relay 37 operates to mark the branch 4 busy and to free the sleeve lead 22. Both the CB–2 relay 36 and the RD–2 relay 37 act to hold the unauthorized call relay 10 operated. Thus the branch 4 is entirely isolated from the trunk circuit and will remain in this condition as long as the subscriber stays on the line and holds the CB–2 relay 36 operated. In the meantime the remainder of the trunk is returned to normal condition so that it may be used for both incoming and outgoing service through the attendant's cabinet.

Upon the release of the CB–1 relay 13 and prior to the release of the RD relay 16, the SH relay 19 will be operated, and this closes a holding circuit for the SR–1 relay 26 and opens the original operating path to the DR relay 10, leaving this unauthorized call relay now completely under control of the calling subscriber.

The SR relay 29 restores, leaving the SR–1 relay 26 now completely under control of the SH relay 19.

After a time interval measured by its slow releasing characteristics, the RD relay 16 restores and thus introduces a front contact and armature of the RD–1 relay 20 in the circuit of the SH relay 19 making the latter now dependent on the RD–1 relay 20.

The release of the RD relay 16 opens the circuit of the RD–1 relay 20 which now releases and opens an alternate holding ground for the RD–11 relay 25. The release of the RD relay 16 and the following release of the RD–1 relay 20 prepares the ATB lead 24. Day battery is disconnected from the BL lead by the restoration of the RD–1 relay 20. RD–1 relay 20 opens the path to the SH relay 19, opens the circuit to the SL relay 21 and thus removes all grounds from the sleeve lead 22 excepting that applied by the SR–1 relay 26 which holds over the slow releasing interval of the SH relay 19 and thereafter the slow releasing interval of the SR–1 relay 26.

The SH relay 19 restores and opens the circuit to the SR–1 relay 26 and closes an alternate holding ground to the DR relay 10 to prevent the termination of the isolated condition of the branch 4 until the minor switch can be restored.

The SR–1 relay restores, applies ground to the ATB lead 24 and removes the last ground to the sleeve lead 22 thus opening the circuit for holding the RD–11 relay 25. When the RD–11 relay restores all battery connections to the busy lamp circuit are opened so that the trunk with the exception of the isolated branch 4 is completely enabled for normal use.

When, thereafter, the calling subscriber holding the isolated branch 4 hangs up, the CB–2 relay 36 will be restored and this in turn will restore the RD–2 relay 37 thus removing ground from the sleeve of the branch 4. The release of the RD–2 relay extends the RA ground to the MZ release magnet 9 and thus the minor switch is released. When fully released the off normal springs of the minor switch open the circuit of its release magnet and the movement of the wiper 7 back to normal opens the last ground from the back contact of the SH relay 19 from the circuit of the DR relay 10 so that the branch 4 is restored to its normal connection to the trunk circuit.

*Authorized call*

If after reaching the branch 4, the calling subscriber dials any one of the digits 2 to 9 inclusive, then the circuit established through the wiper 7 will be extended to the authorized call relay 11 instead of to the unauthorized call relay 10. Relay 11 will lock to ground on the sleeve wire 22, open the circuit to the DR relay 10 and prepare a circuit for the release magnet 9 at some later time when the RD–11 relay 25 is restored. The DR–1 relay 11 is operated upon the restoration of the SH relay 19 after the digit 2 to 9 is dialed.

The calling party may now dial the remaining digits necessary to establish a connection in the central office. Upon completion of dialing the T & R loop from the preceding switch bank remains closed to the CB–1 relay 13 and this relay remains operated throughout the remaining use of the connection.

The SH relay 19 restores, opens the holding circuit to SR–1 relay 26, removes the shunt to the lower winding of the SR relay 29 and the upper right hand coil of repeating coil 14 and reconnects the upper winding of the SR relay 29, in series with the resistor 30 effectively in shunt with the condenser 38 (the resistor 30 may be short circuited if the central office battery is of a low potential). The SR relay 29 reoperates and holds the SR–1 relay 26.

*The called party answers*

When the called party answers, battery is reversed over the T & R leads from the central office. The SR relay 29 may restore momentarily during this operation but it otherwise remains operated and maintains the SR–1 relay 26 in operation.

Conversation now takes place over the T & R leads from the called line through the repeating coil and transmission capacitors to the T & R leads of the calling line.

*Release*

When the called party disconnects the T & R leads are returned to normal battery which may cause the SR relay 29 to restore momentarily but this is of such short duration that the SR–1 relay 26 is maintained steadily operated. No supervision is returned to the calling party.

When the calling party disconnects the T & R selector loop is opened to the calling bridge CB–1 relay 13 and this relay restoring releases the trunk as hereinbefore described.

When the RD–11 relay restores the MZ magnet 10 is operated and the minor switch is released. The trunk is thus restored to normal and rendered available for other calls.

*Outgoing call from attendant's cabinet*

When the attendant inserts a cord plug into the jack 1, resistance battery on the sleeve lead closes an effective circuit to the SL relay 21 and the T & R loop is closed to the calling bridge CB–1 relay 13 through normal contacts of the RU–1 relay 15.

The SL relay 21 operates, opens the operating path to the lower winding of the RD–1 relay 20, connects ground to the sleeve lead 22 to mark the branch 4 and the jack 5 as busy, connects battery to the BL lead, thus lighting the busy lamp 3 providing an indication (at other appearances of the jack 1 and lamps 2 and 3) that the trunk is in use and opens the holding path to the RU–1 relay 15.

The calling bridge relay 13 operates and closes a circuit to the RD relay 16. The calling bridge relay closes its dialing contacts in the ring circuit of the trunk leading to the central office.

It may now be noted that since the SL relay 21 prevents the operation of the RD–1 relay 20 and thus also the operation of the RD–11 relay no circuit may be established for the minor switch stepping magnet 8 and hence no circuits can be established for either the unauthorized call relay 10 or the authorized call relay 11. Dialing over the trunk will proceed as before described and hence it will be seen that the attendant may establish any desired connection including toll and long distance calls.

Thus when a calling subscriber seizes the branch 4 and tries to set up an unauthorized call, the isolation of the branch 4 and the return to him of a tone through the windings of the CB–2 relay 36 will constitute a signal that he must endeavor to make such a call through the assistance of the attendant who alone can establish such an unauthorized call. Otherwise the operation and release of the trunk is the same as hereinbefore described.

*Incoming call*

When this circuit is seized from the central office a circuit is closed from the T & R leads to the upper winding of the SR relay 29 thus causing the operation of this relay. It may be noted that under normal conditions this bridge of the upper winding of the SR relay includes the upper and lower right hand coils of the repeating coil 14 and only the high resistance winding of the SR relay. The low resistance lower winding of relay 29 which constitutes the signaling bridge to the central office is only effective when the SR–1 relay 26 becomes operated and the CB–1 relay 13 is operated. When the trunk is seized at the central office then the upper high resistance winding of the SR relay 29, effectively bridged from tip to ring of the central office line, is energized and this relay becomes operated. The SR–1 relay 26 is thereby operated. The SR–1 relay in operating connects battery to the BL lead to light the busy lamp 2 at the attendant's cabinet, connects ground to the sleeve lead 22 to bar outgoing calls from the branch 4, removes ground from the ATB lead 24 and connects resistance battery to the NL lead 35. The circuit is now held busy at the end distant from the central office until the central office operator chooses to apply ringing current.

When ringing current is applied from the central office it finds a path through the upper right coil of the repeating coil 14, the rectifier bridge 39, the condenser 40, normal contacts of the SH relay 19, the condenser 41 and resistance 42 and the lower right hand coil of the repeating coil to the ring side of the line. Alternating current to the rectifier bridge 39 causes the operation of the RU relay 33 whereby ground at the back contact of the RD–1 relay 20 is connected through the thermistor 43 and the lower winding of the RU–1 relay 15 to battery. If the ringing current causes the RU relay 33 to be operated long enough the thermistor 43 heats up, lowers its resistance and supplies a current in the lower winding of the RU–1 relay 15 to cause the operation thereof. The RU–1 relay 15 operates and locks through its upper winding under control of the sleeve relay 21.

The operation of RU–1 relay 15 connects battery to the LL line lamp 2 to indicate an incoming call at the attendant's cabinet, prepares a circuit for the RD relay 16, closes a holding circuit to the SR–1 relay 26, grounds the CL lead of the night answering trunk circuit, grounds the HL lead of the night answering trunk, shunts the thermistor 43 and connects the springs of the jack 1 directly to the CB–1 relay 13. These conditions obtain until the attendant answers the incoming call.

*Answering the call*

In response to the incoming signal, the lighting of the line lamp 2, the attendant plugs a cord circuit into the jack 1, resistance battery on the S lead closes a circuit to the SL relay 21 and the tip and ring loop is closed directly to the CB–1 relay 13 through the operated contacts of the RU–1 relay 15.

The sleeve SL relay 21 operates, removes battery from the line lamp lead, extinguishes the lamp 2, connects an alternate battery to the busy lamp, opens a connection to the lower winding of the RD–1 relay and connects an alternate ground to the sleeve wire 22. SL relay 21 also opens the holding circuit to the RU–1 relay 15 and closes the T & R loop to the central office through the low resistance lower winding of the SR relay 29, thus tripping the ringing at the central office and opening the circuit for the RU relay 33.

The CB–1 relay 13 operates, closes a circuit to the RD relay 16, connects an alternate loop path to the central office line independent of the SL relay connection.

The RU relay 33 restores and since the holding circuit of the RU–1 relay 15 is now open, this relay also restores. This opens the alternate circuit for the SR–1 relay 26 but this latter relay now remains operated under control of the SR relay 29. The restoration of the RU–1 relay 15 also removes generator and ground connections applied to the branch 4 and the jack 5 for night service purposes and removes ground from the CL lead to the night answering trunk circuit. The shunt about the thermistor 43 is opened, ground on the HL lead is opened and ground on the LL line lamp lead is removed. The loop to the CB–1 relay 13 is transferred to a path through the repeating coil 14.

The RD relay 16 operates, prepares a circuit to the SH relay 19 and connects an alternate ground to the sleeve lead 22 and transfers the tip and ring loop to the central office to the control of the calling bridge relay 13.

Conversation now takes place between the calling party at the central office and the attendant by way of the central office, T & R leads through the repeating coil and transmission capacitors and the T & R leads of the jack 1.

*Release*

When the calling party at the central office disconnects, the line is reversed and this may cause a momentary release of the SR relay 29 but the SR–1 relay 23 due to its slow releasing characteristics remains operated. No supervision is returned to the attendant.

When the attendant disconnects the CB–1 relay 13 is released and the SL relay 21 restores. This removes battery from the BL lead and ground from the sleeve lead 22. The release of the SL relay 21 supplies ground from the back contact of the CB–1 relay 13 to the RD–1 relay 20 and to the SH relay 19. The restoration of the CB–1 relay 13 opens the bridge to the central office and thereafter the circuit to the SR relay 19 is opened with the results hereinbefore described.

*Night service*

This trunk is arranged for night service, that is for service in the absence of the attendant. The attendant will plug a cord circuit into the jack 5 and operate a night service switch 6 which has the effect of removing battery from those battery terminals shown as a square including the negative sign and spoken of as day battery. Thus neither of the lamps 2 or 3 may be lit and the RU–1 relay may not be locked up. The tip and ring leads are connected to the central office by way of the repeating coil 14 and ground is connected to the sleeve of branch 4 by the operated springs on jack 5 to bar outgoing calls by a switch train represented by the selector 12. An outgoing call may be established in the same manner as through the jack 1.

On an incoming call, ringing current applied by the central office closes a circuit to the RU relay 33 which operates the RU–1 relay 15 which in turn places ground on the tip and continuous generator through the upper winding of the RD–1 relay 20 on the ring of the line through the jack 5 to ring the bell of the station now connected to the trunk through this jack 5.

When the call is answered the RD–1 relay responds and holds through its lower winding and during the following silent period in the ringing from the central office when the RU–1 relay 15 is released, the T & R loop now applied causes the operation of the CB–1 relay 13. Thereupon the T & R loop to the central office is closed with the same results hereinbefore described.

Release of the circuit will be the same as hereinbefore described excepting that ground is not removed from the sleeve to the preceding switchbank upon the release of the RD relay 16, the RD–1 relay 20 and the SR–1 relay 26 and also battery is not applied to the BL lead.

What is claimed is:

1. In a telephone system, a private automatic branch exchange hereinafter designated P.A.B.X, a central office hereinafter designated CO, a two way trunk line between said P.A.B.X and said CO, said trunk line terminating at said P.A.B.X in a first means for handling outgoing calls and in a second means for handling both incoming and outgoing calls, means in said trunk line responsive to predetermined digital trains of pulses transmitted over said first means on an outgoing call for isolating said first means and for enabling said second means to handle incoming or outgoing calls while said first means remains isolated.

2. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, means in said trunk circuit responsive to dial pulses characterizing unauthorized outgoing connections transmitted from said first branch for isolating said first branch from said trunk line and for transmitting back over said first branch a signal to indicate to the subscriber thereon that the attempted connection is unauthorized.

3. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, a stepping switch in said trunk circuit responsive to dial pulses characterizing unauthorized outgoing connections transmitted from said first branch and means controlled thereby for isolating said first branch from said trunk and for signalling a subscriber thereon that such an attempted connection is unauthorized.

4. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, a stepping switch in said trunk circuit responsive to dial pulses transmitted from said first branch, predetermined trains of said dial pulses characterizing outgoing connections, an unauthorized call relay and an authorized call relay controlled by said stepping switch, means controlled by said unauthorized call relay for isolating said first branch from said trunk and for enabling said second branch and means controlled by said authorized call relay for isolating said stepping switch from said first branch.

5. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls under calling subscriber control from said P.A.B.X to and through said CO and another of said branches terminating in means to answer incoming calls to said P.A.B.X and means to extend outgoing calls from said P.A.B.X through said CO, a minor switch in said trunk circuit responsive to dial pulses transmitted from said first branch, an unauthorized call relay and an authorized call relay controlled alternatively by said minor switch, means controlled by said unauthorized call relay for disconnecting said first branch from said trunk, said disconnected branch being held under control of said calling subscriber the remainder of said trunk being released and rendered operative for service over said second branch.

6. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, means in said trunk circuit to differentiate between authorized and unauthorized calls including an unauthorized call relay and an authorized call relay, means responsive to the operation of said unauthorized call relay to cut off said first branch and to signal a subscriber thereon that his call is unauthorized and cannot be completed and means responsive to the operation of said authorized call relay for disconnecting said differentiating means to prevent a subsequent random operation of said unauthorized call relay.

7. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, means in said trunk circuit to differentiate between authorized and unauthorized calls including an unauthorized call relay and an authorized call relay, means responsive to the operation of said unauthorized call relay to cut off said first branch and to signal a subscriber thereon that such a call must be routed over said second branch.

8. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, means for preventing the use of said trunk for toll calls over said first branch consisting of means for isolating said first branch and for signaling the subscriber thereon that a toll call cannot be completed thereover.

9. In a telephone system, a private automatic branch exchange hereinafter designated P.A.B.X, a central office hereinafter designated CO, a two way trunk line between said P.A.B.X and said CO having a plurality of branches at said P.A.B.X, one of said branches terminating in means to extend dial controlled outgoing calls from said P.A.B.X to and through said CO and another of said branches terminating in means to answer incoming calls to said P.A.B.X and means to extend outgoing calls from said P.A.B.X through said CO, means for preventing the use of said trunk for toll calls over said first branch consisting of means for isolating said first branch and for enabling said second branch for normal use.

References Cited in the file of this patent

UNITED STATES PATENTS

| | | |
|---|---|---|
| 2,586,534 | Gray | Feb. 19, 1952 |
| 2,813,930 | Berch | Nov. 19, 1957 |
| 2,852,614 | Heyduck | Sept. 16, 1958 |